United States Patent
Suhy et al.

(10) Patent No.: US 10,645,356 B1
(45) Date of Patent: May 5, 2020

(54) TARGETED VIDEO STREAMING POST-PRODUCTION EFFECTS

(71) Applicant: Amazon Technologies, Inc., Seattle, WA (US)

(72) Inventors: Steve Martin Suhy, Sammamish, WA (US); Kyle Roche, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/118,008

(22) Filed: Aug. 30, 2018

(51) Int. Cl.
| | |
|---|---|
| *H04N 7/173* | (2011.01) |
| *H04N 9/74* | (2006.01) |
| *A63F 13/86* | (2014.01) |
| *G09G 5/06* | (2006.01) |
| *G06T 11/00* | (2006.01) |

(52) U.S. Cl.
CPC ............... *H04N 9/74* (2013.01); *A63F 13/86* (2014.09); *G06T 11/001* (2013.01); *G09G 5/06* (2013.01)

(58) Field of Classification Search
None
See application file for complete search history.

(56) References Cited

U.S. PATENT DOCUMENTS

| | | | | |
|---|---|---|---|---|
| 6,771,323 | B1 * | 8/2004 | Dean | G11B 27/034 |
| | | | | 348/180 |
| 8,749,618 | B2 * | 6/2014 | Fiumi | H04N 13/106 |
| | | | | 348/43 |
| 9,473,758 | B1 * | 10/2016 | Long | A63F 13/497 |
| 2002/0156842 | A1 * | 10/2002 | Signes | H04L 29/06 |
| | | | | 709/203 |
| 2005/0134801 | A1 * | 6/2005 | Bogdanowicz | H04N 5/253 |
| | | | | 352/38 |
| 2007/0035665 | A1 * | 2/2007 | Khare | H04N 5/262 |
| | | | | 348/586 |
| 2007/0044133 | A1 * | 2/2007 | Hodecker | H04N 7/17336 |
| | | | | 725/117 |
| 2007/0124781 | A1 * | 5/2007 | Casey | H04N 7/17318 |
| | | | | 725/94 |
| 2007/0150917 | A1 * | 6/2007 | Fernandez | G11B 27/034 |
| | | | | 725/10 |
| 2008/0098032 | A1 * | 4/2008 | Wu | G11B 27/034 |
| 2008/0291261 | A1 * | 11/2008 | Park | H04N 7/147 |
| | | | | 348/14.02 |
| 2009/0228796 | A1 * | 9/2009 | Eggink | H04N 21/25891 |
| | | | | 715/716 |

(Continued)

*Primary Examiner* — William J Kim
(74) *Attorney, Agent, or Firm* — BakerHostetler

(57) ABSTRACT

Visual effects such as bleach bypass, sepia tone conversion, cross processing, custom effects, and many others may be applied to video streams before they are displayed to viewers. In some examples, different visual effects may be applied to the same underlying video content, such as on a viewer-by-viewer basis or at other levels of granularity, thereby allowing certain particular visual effects to be targeted to particular viewers/devices. The visual effects may be applied by one or more of a content provider, a video streaming service, one or more viewers, or by other entities. The visual effects may be applied based at least in part on instructions from the provider, such as one or more tags, for example that may be issued via an interface provided by a video streaming service.

17 Claims, 10 Drawing Sheets

(56) References Cited

U.S. PATENT DOCUMENTS

| | | | |
|---|---|---|---|
| 2010/0158366 A1* | 6/2010 | Brown | G11B 27/034 382/167 |
| 2012/0026405 A1* | 2/2012 | Atkins | G11B 27/034 348/651 |
| 2012/0100910 A1* | 4/2012 | Eichorn | H04N 21/43615 463/31 |
| 2012/0315020 A1* | 12/2012 | Fiumi | H04N 21/258 386/278 |
| 2013/0076974 A1* | 3/2013 | Atkins | H04N 5/235 348/362 |
| 2013/0101115 A1* | 4/2013 | Khamkhosy | H04N 5/222 380/201 |
| 2013/0343727 A1* | 12/2013 | Rav-Acha | G11B 27/031 386/282 |
| 2015/0043892 A1* | 2/2015 | Groman | H04N 21/47205 386/278 |
| 2015/0082203 A1* | 3/2015 | James | H04N 21/23418 715/756 |
| 2017/0105030 A1* | 4/2017 | Kelly | H04N 21/23439 |
| 2018/0176526 A1* | 6/2018 | Sivalingam | H04N 5/76 |

* cited by examiner

TARGETED VIDEO STREAMING POST-PRODUCTION EFFECTS

BACKGROUND

Video content may be produced for presentation using a variety of formats and devices. As an example, movie and/or television video may often be filmed using video cameras, such as at a production studio or other filming location. In some cases, after video is shot and recorded, certain visual effects (e.g., special effects, filters, etc.) may often be applied to the video, which are commonly referred to as post-production effects. Some common post-production effects may include visual effects such as bleach bypass, sepia tone conversion, cross processing, and other color conversions and/or effects. Post-production effects may often be employed to make video appear to relate to a certain time period (e.g., historical, antique, futuristic, etc.), to evoke certain emotional responses in viewers (e.g., a warm, happy, sad, disturbing, intense, excited, etc.), or for other reasons.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
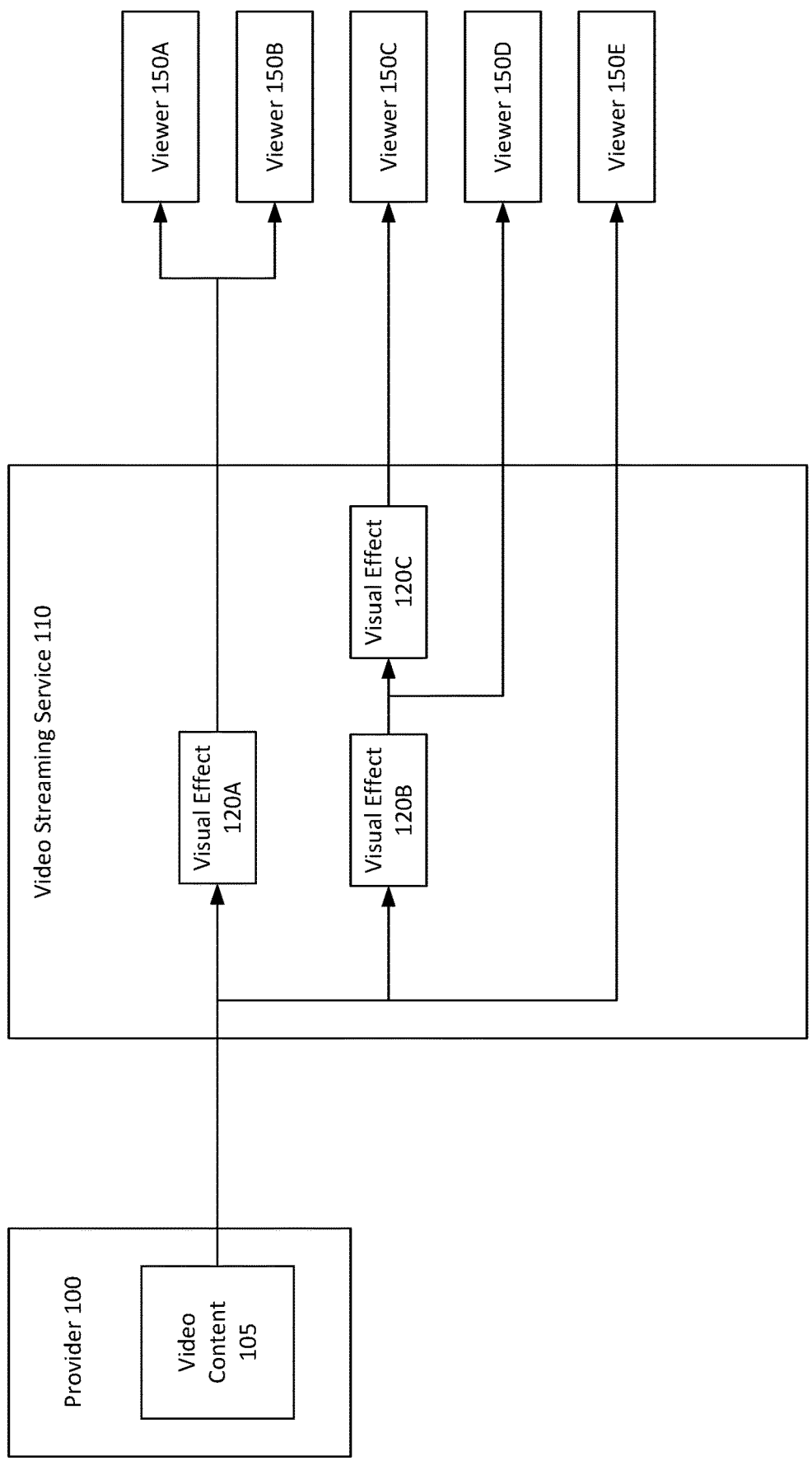
FIG. 1 is a diagram illustrating an example service-applied visual effects targeting system that may be used in accordance with the present disclosure.

Various techniques for targeted application of post-production effects to streaming video content are described herein. In particular, in some examples, video content may be streamed from a content provider, sometimes referred to as a streamer, to one or more viewers over one or more communications networks. In some cases, the video content may be streamed directly from the content provider to the viewers. In other cases, the video content may be streamed from the content provider to an intermediary, such as a video streaming service, which may, in turn, broadcast the video content to large numbers of viewers. In one specific example, the content provider may be a video game player that plays a video game, captures video output from the game, and streams the video output to the video streaming service and/or one or more viewers. In some examples, the video content may include live streaming video content, in which video of a live event is captured, and the captured video content is transmitted and played to viewers while the live event is still occurring. Live streaming video content is played to viewers with only a small amount of latency between the time that the video is captured and the time that the video is presented to the viewers, thereby creating the effect that the video content is being seen live by the viewers as it occurs in real time (or only very shortly after it occurs in real time). For example, this may allow viewers to view video of a video game or other live event while the live event is still occurring (e.g., while the video game is still being played). In some examples, the streamer may operate a video capture component, such as screen capture software, that captures video from the streamer's device, such as video of a game being played by the streamer, for transmission to the viewers.

In some examples, one or more post-production visual effects may be applied to the video content that is streamed from the content provider to the viewers. For example, for video gaming content such as described above, the post-production visual effects may, in some cases, be applied to the video content after the video content has been rendered and output by the video game that is being played by the streamer. The post-production visual effects may be applied to the streaming video content by any combination of one or more nodes along the content's transmission path. For example, in some cases, the one or more visual effects may be applied by the content provider, by the video streaming service, by the viewers, and/or by one or more other intermediaries.

Application of visual effects to the video content by the video streaming service may provide a number of advantages. For example, by applying visual effects at the video streaming service, it may be possible to target different visual effects to different viewers, while still only requiring a single stream of video content to be transmitted from the content provider to the video streaming service. For example, in some cases, the video streaming service may receive a particular stream of video content from a content provider. The video streaming service may then apply a first visual effect to the video content and transmit the video content, with the first visual effect applied thereto, to a first viewer. The video streaming service may also apply a second visual effect to the video content and transmit the video content, with the second visual effect applied thereto, to a second viewer. In some cases, the first visual effect may not applied to the video sent to second viewer, while the first visual effect may also not be applied to the video sent to the first viewer. This may allow the first visual effect to be targeted to the first viewer, while also allowing the second visual effect to be targeted to the second viewer.

Thus, as described above, the techniques described herein may allow targeting of different post-production visual effects to different stream viewers. Unlike the targeting techniques described herein, post-production visual effects may often be applied to traditional movie and television content using a "one size fits all" approach in which the same video content with the same applied visual effects is distributed to all viewers. By contrast, the visual effects targeting techniques described herein may allow different visual effects to be applied to the same video content that is transmitted and/or presented to different stream viewers.

In some examples, different visual effects may also be applied locally by individual viewers at their respective local/client devices. Application of visual effects locally by viewers may offer some of the same visual effect targeting benefits described above. It is noted, however, that application of visual effects by the video streaming service may still offer additional benefits in comparison to viewer/client devices. For example, application of visual effects by the video streaming service may allow visual effects to be applied and sent to large numbers of viewer devices without requiring duplication of the effects processing at each viewer device. Additionally, the video streaming service may often offer enhanced processing capabilities (e.g., server-based and/or cloud-based processing) that may not be available at local viewer/client devices. These enhanced processing capabilities may potentially allow visual effects to be applied more quickly and with higher quality, detail and reliability.

In some embodiments, regardless of whether the visual effects are applied by the content provider, the video streaming service, the viewers, and/or by others, the content provider may still have at least partial control over the application of visual effects to video content provided by the content provider. For example, in some cases, the content provider may be able to at least partially control factors such as which visual effects are applied to the video content, at which times the visual effects are applied, to which portions of the video content the visual effects are applied, to which viewers the applied visual effects are provided, and many other factors. In particular, in some examples, the content provider may issue instructions, such as one or more tags, that indicate the content provider's preferences for application of the visual effects to the video content. In some examples, these instructions may be embedded into the video content stream that is transmitted from the content provider to the video streaming service, such as in the headers or in other fields or locations within the video content stream. In other examples, the instructions may be transmitted separately (i.e., external to the video stream) from the content provider to the video streaming service.

In one specific example, the video streaming service may provide an interface to the content provider that assists in the application of visual effects to video streams. For example, in some cases, the interface may include a listing of visual effects that are made available by the video streaming service for application to video streams. The interface may then allow the content provider to select one or more of the available visual effects, for example for application to one or more streams that the content provider is currently transmitting, will transmit in the future, and/or has already transmitted at some prior time. Also, in some examples, the interface may indicate one or more stream viewers that are currently viewing a video content stream, and may allow the content provider to target different visual effects to different viewers. For example, the interface may allow the content provider to specify that a first visual effect is to be applied to video content that is transmitted to a first viewer, while a second visual effect is to be applied to video content that is transmitted to a second viewer. Furthermore, in some examples, the interface may allow the provider to specify that certain visual effects should be applied at certain times of day, to certain types of video content, to particular frames, portions of frames (e.g., coordinates, etc.) or other portions of the video content, and the like. For example, the interface may allow the content provider to request that a night-vision effect should be applied to video content that is transmitted during night times, while a brightening effect should be applied to content that is transmitted during day times. In yet other examples, the interface may allow the content provider to request that certain visual effects should be applied to war or shooting video games, while other visual effects should be applied to sports or racing video games. Furthermore, in some examples, the interface may allow the content provider to specify that certain visual effects should be applied to video transmitted to viewer devices having certain particular characteristics, such as certain screen sizes, resolutions, processing and/or memory capabilities, operating systems, processor types, certain types of devices (e.g., phones, televisions, tablets, laptop computers, etc.), and other characteristics.

In yet other examples, state data from a video game may be provided by a content provider (or from a game server or other entity) to the video streaming service and used by the video streaming service to determine when to apply certain visual effects. For example, the interface may allow the content provider to request that certain visual effects should be applied when the content provider is winning a match, while other visual effects should be applied when the content provider is losing a match. Additionally, content providers may request that certain visual effects should be applied when the content provider's character is at certain virtual locations in the game world, such as in forests, cities, mountains, etc. Furthermore, in some examples, the interface may allow the content provider to create and define custom visual effects for use with the content provider's video. For example, the interface may allow the content provider to create pixel conversion lookup tables or provide other information for converting pixel values to create a visual effect. The interface may also allow the content provide to edit available visual effects, such as by combining effects, changing pixel conversion rules, and the like.

In some examples, viewers may also be permitted to provide instructions or other input regarding visual effects that are applied to the streaming video content. For example, in some cases, the video streaming service may provide a viewer interface that allows the viewers to provide input regarding application of visual effects. In particular, in some examples, the viewer interface may indicate a group of visual effects that have been approved by the content provider and may allow the viewer to select one or more visual effects from the group of visual effects that are approved by the content provider. Also, in some examples, viewers may be permitted to propose one or more visual effects via the viewer's interface, and the content provider may be permitted to accept or decline the proposed visual effects via the provider's interface. In other examples, providers may be permitted to propose one or more visual effects via the provider's interface, and a viewer may be permitted to accept or decline the proposed visual effects via the viewer's interface.

Referring now to FIG. 1, an example visual effects targeting system will now be described in detail. In particular, as shown in FIG. 1, video content 105 may be streamed from a content provider and/or streamer, namely provider 100, to viewers 150A-E, over one or more communications networks. In the example of FIG. 1, the video content 105 is streamed from provider 100 to viewers 150A-E via an intermediary, namely video streaming service 110. In some examples, however, video content 105 may be streamed directly from the provider 100 to the viewers 150A-E, for example without passing through video streaming service 110 and/or other intermediaries. The video content 105 may be streamed from provider 100 to video streaming service 110 and, in turn, from video streaming service 110 to viewers 105A-E over one or more communications networks, for example including one or more local area networks (LAN's) and/or one or more wide area networks (WAN's) such as the Internet. The video content 105 may be transmitted using streaming video transmission techniques, in which portions of the video content 105 are received and played by a recipient (e.g., viewers 150A-E) while subsequent portions of the same video content 105 are still being transmitted by a sender (e.g., video streaming service 110 and/or provider 100). In one specific example, the provider 100 may be a video game player that plays a video game, captures video output from the game, and streams the video output to the video streaming service and/or one or more viewers. In some examples, the provider 100 may include or operate a video capture component, such as screen capture software, that captures video from the provider's device, such as video of a game being played by the provider, for transmission to the viewers 150A-E.

In some examples, video content 105 may include live streaming video content, in which video of a live event is captured, and the captured video content is transmitted and played to viewers while the live event is still occurring. Live streaming video content is played to viewers with only a small amount of latency between the time that the video is captured and the time that the video is presented to the viewers, thereby creating the effect that the video content is being seen live by the viewers as it occurs in real time (or only very shortly after it occurs in real time). Events that are included in live streaming video content may include events such as live video games, live sporting events, live news or entertainment events, and the like. For example, in some cases, live streaming may allow viewers 150A-E to view video of a video game or other live event while the live event is still occurring (e.g., while the video game is still being played).

As shown in FIG. 1, visual effects 120A-C, which may be post-production visual effects, may be applied to the video content 105. For example, for video gaming content such as described above, the post-production visual effects may, in some cases, be applied to the video content after the video content has been rendered and output by the video game that is being played by the provider. In some examples, visual effects 120A-C may include visual effects such as bleach bypass, sepia tone conversion, cross processing, and other color conversions and/or effects. It is noted, however, that visual effects 120A-C are not limited to these or any other types of visual effects and may also include, for example, unique or custom visual effects, combinations of visual effects, edited or modified visual effects, and other types of visual effects. Post-production effects may often be employed to make video appear to relate to a certain time period (e.g., historical, antique, futuristic, etc.), to evoke certain emotional responses in viewers (e.g., a warm, happy, sad, disturbing, intense, excited, etc.), or for other reasons. In some examples, application of visual effects 120A-C may include converting color values of one or more pixels from an input color value to an output color value. In particular, in some cases, the pixel color value conversions may be applied on a pixel-by-pixel basis and/or on a frame-by-frame basis. In some examples, the pixel color value conversions may be performed using a lookup table, a per-pixel color conversion algorithm, and/or other conversion information, for example that indicates one or more input pixel color values and that indicates, for each identified input pixel color value, a corresponding respective output pixel color value to which the input pixel value is to be converted. The above described example characteristics of visual effects 120A-C may also optionally apply to any or all other visual effects mentioned or described in this document.

In the example of FIG. 1, visual effects 120A-C are applied to the video content 105 by the video streaming service 110. As described above, this may provide a number of advantages. For example, by applying visual effects 120A-C at the video streaming service 110, it may be possible to target different visual effects to different viewers, while still only requiring a single stream of video content to be transmitted from the content provider to the video streaming service. For example, as shown in FIG. 1, the video streaming service 110 may apply visual effect 120A to the video content 105 and transmit the video content 105, with the first visual effect 120A applied thereto, to viewers 150A-B. At the same time, the video streaming service 110 may also apply visual effect 120B to the video content 105 and transmit the video content 105, with the visual effect 120B applied thereto, to viewers 150C-D. In the example of FIG. 1, the visual effect 120A may not be applied to the video sent to viewers 150A-B, while the visual effect 120B may also not be applied to the video sent to the viewers 150C-D. This may allow visual effect 120A to be targeted to viewers 150A-B, while also allowing the visual effect 120B to be targeted to viewers C-D. For example, in some cases, visual effect 120A could be a cross processing effect, while visual effect 120B could be a sepia tone conversion effect.

Additionally, in the example of FIG. 1, a third visual effect 120C is specifically targeted to viewer 150C, such that both visual effects 120B and 120C are applied to the video content 105 that is sent to viewer 150C. Visual effect 120C may not be applied to the video content 105 that is sent to other viewers 120A, B, D and E. Furthermore, in the example of FIG. 1, video content 105 may be transmitted to viewer 150E with no visual effects applied thereto, thereby illustrating that there is no requirement that any or all visual effects be applied to video content that is sent to any particular viewer. It is noted that the example applications and distributions of visual effects shown in FIG. 1 are non-limiting and that any number and combination of different visual effects may be employed in accordance with the disclosed techniques.

Figure 2:
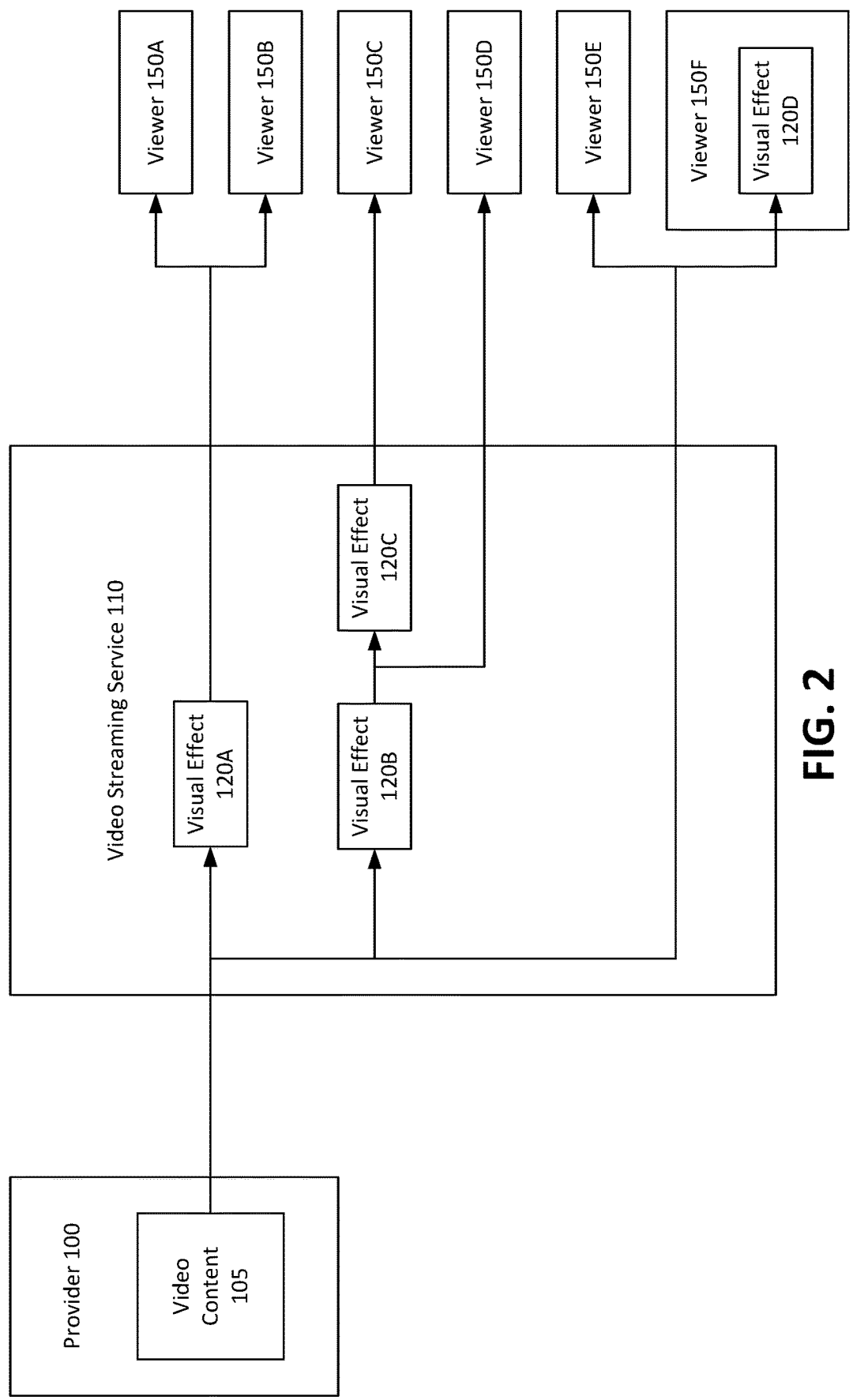
FIG. 2 is a diagram illustrating an example service-applied and viewer-applied visual effects targeting system that may be used in accordance with the present disclosure.

In some examples, in addition or as an alternative to applying visual effects by the video streaming service, visual effects may be applied individually by one or more viewer/client nodes or devices. Referring now to FIG. 2, an example of viewer-applied visual effects will now be described in detail. In particular, as shown in FIG. 2, a fourth visual effect 120D is applied by viewer 150F at a local node and/or device operated by viewer 150F. In some examples, visual effect 120D may be applied only to the video content 105 presented to viewer 150F and not to other viewers 150A-E. In the particular example of FIG. 2, visual effect 120D is a different visual effect than visual effects 120A-C. It is noted, however, that visual effects applied by viewer devices may be the same or different than visual effects applied by the video streaming service 110 and/or the provider 100.

Thus, in some examples, similar to application of visual effects by the video streaming service 110, application of visual effects locally by viewers may also allow visual effect targeting to particular viewers. It is noted, however, that application of visual effects by the video streaming service 110 may still offer additional benefits in comparison to viewer/client devices. For example, application of visual effects by the video streaming service 110 may allow visual effects to be applied and sent to large numbers of viewer devices without requiring duplication of the effects processing at each viewer device. Additionally, in some examples, the video streaming service 110 may often offer enhanced processing capabilities (e.g., server-based and/or cloud-based processing) that may not be available at local viewer/client devices. These enhanced processing capabilities may potentially allow visual effects to be applied more quickly and with higher quality, detail and reliability.

Figure 3:
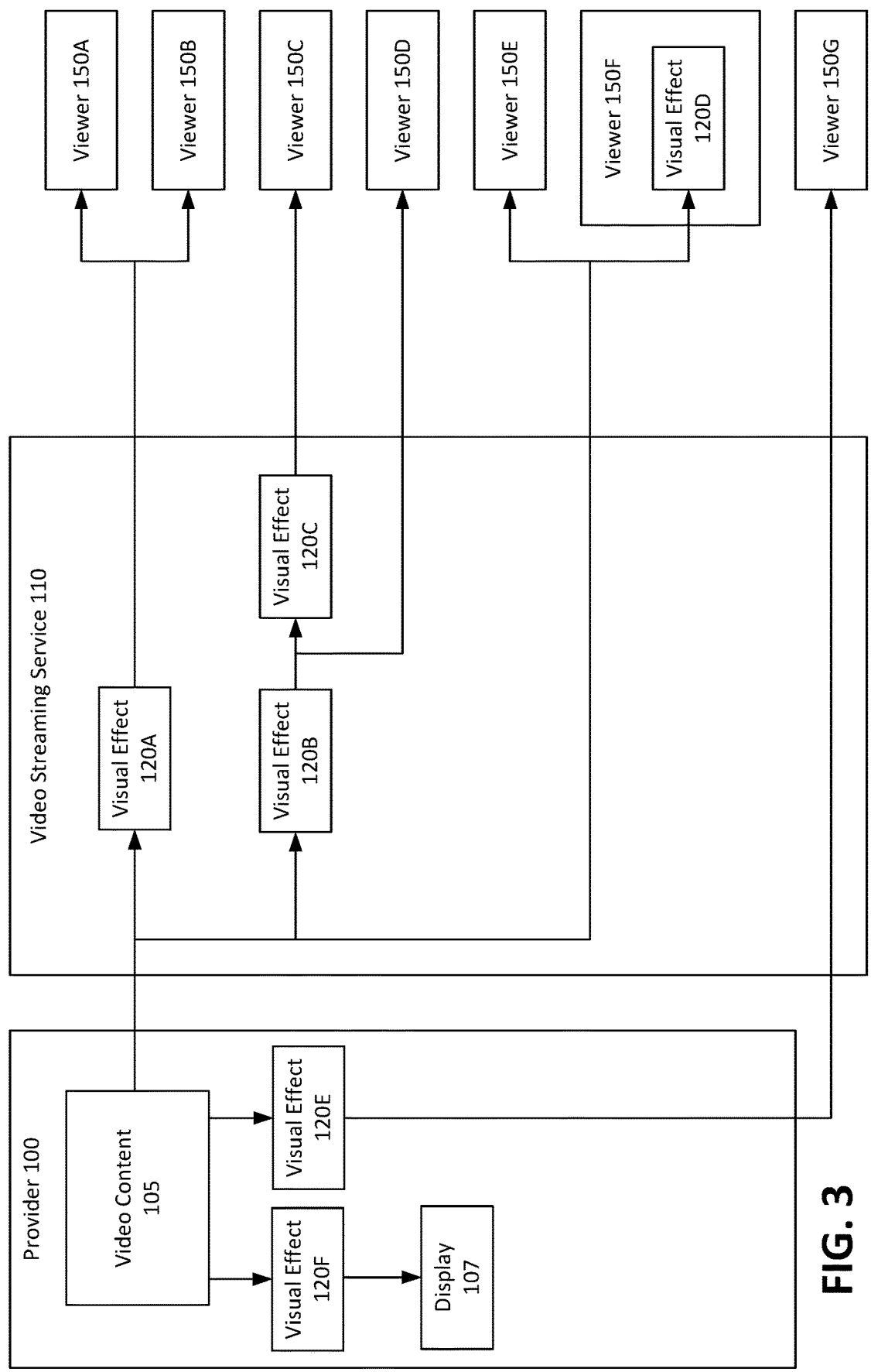
FIG. 3 is a diagram illustrating an example service-applied, viewer-applied, and provider-applied visual effects targeting system that may be used in accordance with the present disclosure.

In yet other examples, in addition or as an alternative to applying visual effects by the video streaming service and/or the viewers, visual effects may be applied by the provider 100. Referring now to FIG. 3, an example of provider-applied visual effects will now be described in detail. In particular, as shown in FIG. 3, a visual effect 120E is applied to video content 105 by provider 100. The video content 105 with visual effect 120E applied thereto is then transmitted, via video streaming service 110, to viewer 150G. Additionally, another visual effect 120F is applied to video content 105 by provider 100. The video content 105 with visual effect 120F applied thereto is then presented locally to the provider 100 (e.g., on a node/device operated by the provider) via display 107. In some examples, visual effect 120F may be applied only to the video content 105 presented to provider 100 and not to viewers 150A-G. This may allow, for example, the provider 100 to view certain visual effects (e.g., visual effect 120F) that may be desirable for the provider but that may not be desirable for viewers 150A-G, such as visual effects that may assist the provider in playing a video game but that may be distracting to non-player viewers. Additionally, in some examples, visual effects 120A-E may be applied only to the video content 105 presented to viewers 150A-G and not to provider 100. This may allow, for example, the viewers 150A-G to view certain visual effects (e.g., visual effects 120A-E) that may be desirable for the viewers 150A-G but that may not be desirable for provider 100, such as visual effects that may assist enhance the viewing experience of non-player video game viewers but that may be distracting to video game players. In the particular example of FIG. 3, visual effect 120E-F are different visual effects than visual effects 120A-D. It is noted, however, that visual effects applied by the provider may be the same or different than visual effects applied by the video streaming service 110 and/or the viewers 150.

Although not depicted in FIGS. 1-3, it is noted that the output of any or all of visual effects 120A-E may be recorded and stored for future viewing. This may enable, for example, different copies of the same video content (e.g. video from the same video game) to be stored with different visual effects applied thereto. For example, a first copy of video from a video game may have a cross processing effect applied thereto, while a second copy of video from the same video game could have a sepia tone conversion effect applied thereto. Any or all of these different copies may then subsequently be retrieved and played to viewers upon request. Additionally, other different visual effects may applied to other copies of the same video content that are recorded and stored even in cases when those visual effects are not viewed live by any viewers—such as when the visual effects are applied solely for the purpose of being recorded and viewed at a later time.

Figure 4:
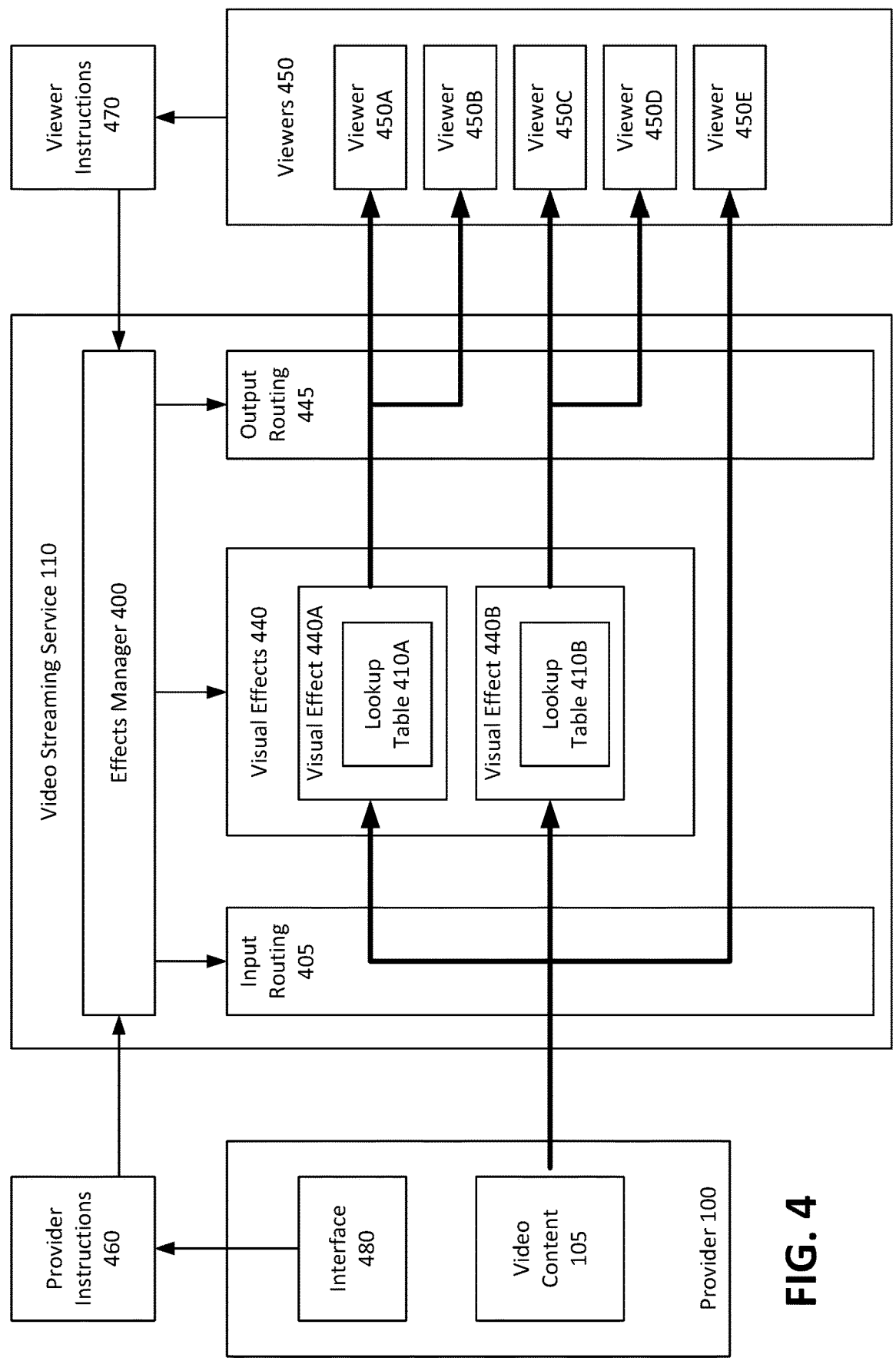
FIG. 4 is a diagram illustrating an example targeted visual effects management system that may be used in accordance with the present disclosure.

Referring now to FIG. 4, an example targeted visual effects management system will now be described in detail. In particular, as shown in FIG. 4, video content 105 is transmitted from provider 100 to video streaming service 110 over one or more communications networks. Video streaming service 110 operates an effects manager 400, which manages application of visual effects 440 to the video content 105. In particular, in the example of FIG. 4, two visual effects 440A-B are being simultaneously applied to the video content 105. Visual effect 440A is applied to the video content 105 that is transmitted to viewers 450A-B. Additionally, visual effect 440B is applied to the video content 105 that is transmitted to viewers 450C-D. In this particular example, visual effect 440A is not applied to the video content 105 that is transmitted to viewers 450C-D. Additionally, visual effect 440B is not applied to the video content 105 that is transmitted to viewers 450A-B. Also, in this example, no visual effects are applied to the video content 105 that is transmitted to viewer 450E. In the example of FIG. 4, visual effects 440A-B are each applied using a respective lookup table 410A-B. For example, for visual effect 440A, lookup table 410A may indicate one or more input pixel color values that may be included in the video content 105 received from the provider 100. Lookup table 410A may indicate, for each identified input pixel color value, a corresponding respective output pixel color value to which the input pixel value is to be converted. Lookup table 410B may include pixel conversion information for visual effect 440B. Thus, for one or more of the same input pixel color values, the output pixel color values indicated in lookup table 410A may be at least partially different from the output pixel color values indicated in lookup table 410B.

In the example of FIG. 4, effects manager 400 controls input routing 405 and output routing 445 to and from the visual effects 440. For example, input routing 405 may include assigning one or more components to apply each visual effect 440A-B and routing an incoming stream of the video content 105 such that it is provided to the assigned components for each of the visual effects 440A-B. In some examples, this may include making one or more copies of the incoming video content 105 or otherwise dividing and/or distributing the video content 105 into multiple streams such that different visual effects may be applied to different streams. Output routing 445 may include routing the output of each visual effect 440A-B to one or more viewers that are designated to view video content 105 having the particular visual effects 440A-B applied thereto. Additionally, for scenarios in which at least one viewer 450E is designated to receive video content 105 with no visual effects applied thereto, input routing 405 and output routing 445 may also include routing video content 105 such that it is delivered to the appropriate viewer(s) 450E with no visual effects applied thereto.

In some examples, effects manager 400 may perform operations such as determining when to begin applying new/different visual effects to the video content 105, when to cease applying visual effects to the video content 105, when to combine, edit or modify visual effects and many other operations. Additionally, effects manager 400 may perform routing operations such as determining when a particular viewer is to start and/or stop receiving video content having one or more particular visual effects applied thereto, when a viewer is to switch from one visual effect to another, to receive combined or modified visual effects, and the like. In some examples, effects manager 400 may perform the above-described and other determinations, including for example input routing 405 and output routing 445, based, at least in part, on provider instructions 460 and/or viewer instructions 470.

Provider instructions 460 may generally include instructions from the provider 100, such as tags, interface selections, and the like, that relate to application of visual effects to the video content 105. In some embodiments, regardless of whether the visual effects are applied by the provider 100, the video streaming service 110, the viewers 450, and/or by others, the provider 100 may still have at least partial control over the application of visual effects to video content 105 provided by the provider 100. For example, in some cases, the provider 100 may be able to at least partially control factors such as which visual effects are applied to the video content 105, at which times the visual effects are applied, to which portions of the video content 105 the visual effects are applied, to which viewers the applied visual effects are provided, and many other factors. In particular, in some examples, the provider instructions 460 may indicate the provider's preferences for application of the visual effects to the video content 105. In some examples, at least part of the provider instructions 460 may be embedded into the video content stream that is transmitted from the provider 100 to the video streaming service 110, such as in the headers or in other fields or locations within the video content stream. Also, in some examples, at least part of the provider instructions 460 may be transmitted separately (i.e., external to the video stream) from the provider 100 to the video streaming service 110.

As shown in FIG. 4, the video streaming service 110 may provide an interface 480 to the provider 100 that assists in the application of visual effects to video streams. For example, in some cases, the interface 480 may include a listing of visual effects that are made available by the video streaming service 110 for application to video streams. The interface 480 may then allow the provider 100 to select one or more of the available visual effects, for example for application to one or streams that the content provider is currently transmitting, will transmit in the future, and/or has already transmitted at some prior time. Also, in some example, the interface 480 may indicate one or more stream viewers that are currently viewing a video content stream, and may allow the provider 100 to target different visual effects to different viewers. For example, the interface 480 may allow the provider 100 to specify that visual effect 440A is to be applied to video content 105 that is transmitted to viewers 450A-B, that visual effect 440B is to be applied to video content 105 that is transmitted to viewers 450C-D, and/or that no visual effect is to be applied to video content 105 that is transmitted to viewer 450E.

In some examples, the interface 480 may allow provider 100 to specify that certain visual effects should be applied at certain times of day, to certain types of video content, to particular frames, portions of frames (e.g., coordinate ranges, etc.) or other portions of the video content, and the like. For example, the interface 480 may allow the provider 100 to request that a night-vision effect should be applied to video content that is transmitted during night times, while a brightening effect should be applied to content that is transmitted during day times. In yet other examples, the interface 480 may allow the provider 100 to request that certain visual effects should be applied to war or shooting video games, while other visual effects should be applied to sports or racing video games. Furthermore, in some examples, the interface 480 may allow the provider 100 to specify that certain visual effects should be applied to video transmitted to viewer devices having certain particular characteristics, such as certain screen sizes, resolutions, processing and/or memory capabilities, operating systems, processor types, certain types of devices (e.g., phones, televisions, tablets, laptop computers, etc.), and other characteristics. In yet other examples, state data from a video game may be transmitted from provider 100 (or from a game server or other entity) to the video streaming service 110 and used by the video streaming service 110 to determine when to apply certain visual effects. For example, the interface 480 may allow the provider 100 to request that certain visual effects should be applied when the provider 100 is winning a match, while other visual effects should be applied when the provider 100 is losing a match. Additionally, the provider 100 may request that certain visual effects should be applied when the provider's character is at certain virtual locations in the game world, such as in forests, cities, mountains, etc. Furthermore, in some examples, the interface 480 may allow the provider 100 to create and define custom visual effects for use with the provider's video. For example, the interface 480 may allow the provider 100 to create pixel conversion lookup tables or provide other information for converting pixel values to create a visual effect. The interface 480 may also allow the content provide to edit available visual effects, such as by combining effects, changing pixel conversion rules, and the like.

As also shown in FIG. 4, effects manager 400 may receive viewer instructions 470 from one or more of viewers 450. Viewer instructions 470 may generally include instructions regarding the viewer's preferences for application of visual effects to the streaming video content 105. For example, in some cases, the video streaming service may provide a viewer interface to one or more of viewers 450 that allows input of the viewer instructions 470. In particular, in some examples, the viewer interface may indicate a group of visual effects that have been approved by the provider 100 and may allow the viewer to select one or more visual effects from the group of visual effects that are approved by the provider 100. Also, in some examples, a viewer may be permitted to propose one or more visual effects via the viewer's interface, and the provider 100 may be permitted to accept or decline the proposed visual effects via the provider's interface 480. In other examples, provider 100 may be permitted to propose one or more visual effects via the provider interface 480, and a viewer may be permitted to accept or decline the proposed visual effects via the viewer's interface.

Figure 5:
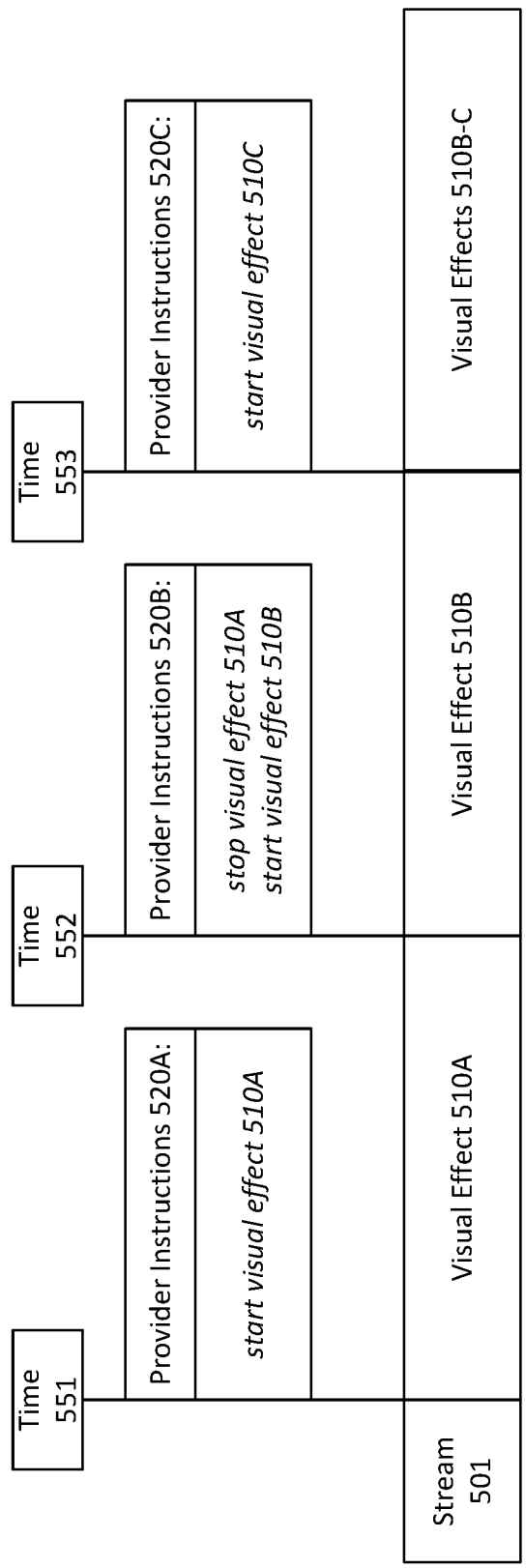
FIG. 5 is a diagram illustrating first example visual effects applications that may be used in accordance with the present disclosure.
Figure 6:
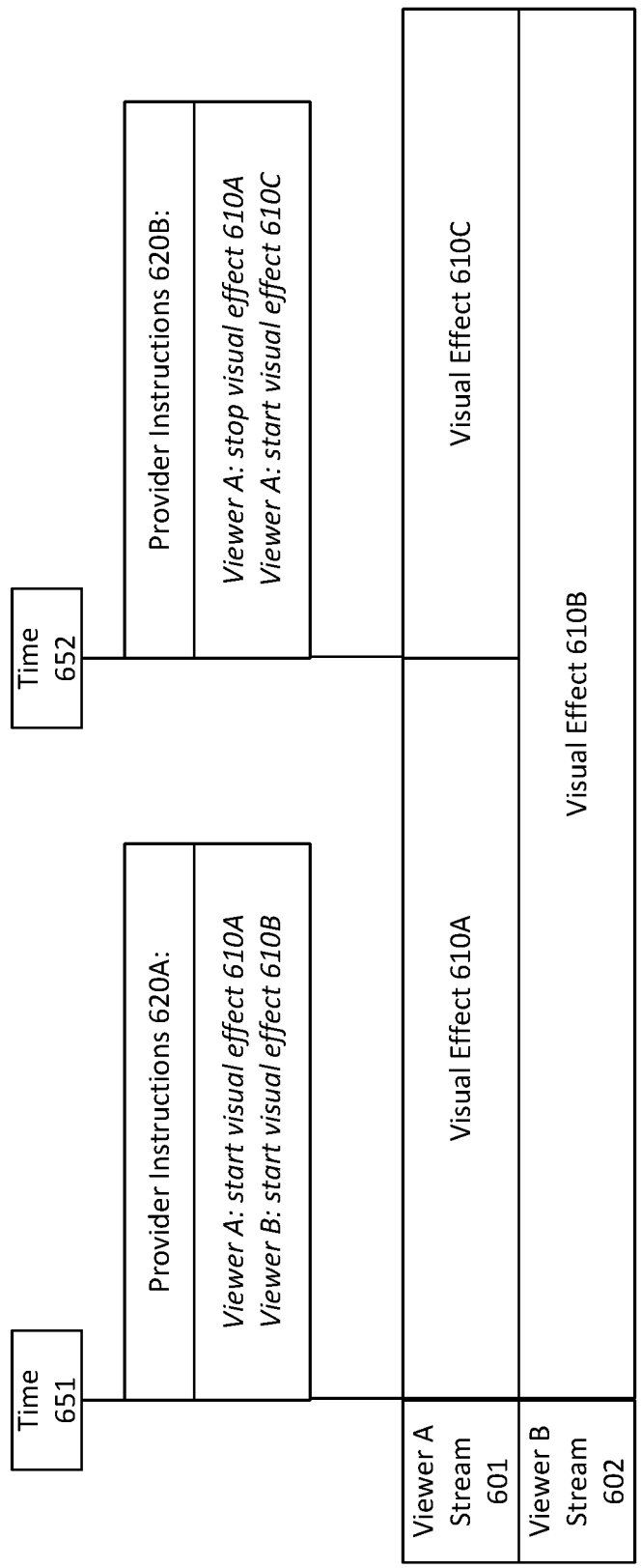
FIG. 6 is a diagram illustrating second example visual effects applications that may be used in accordance with the present disclosure.
Figure 7:
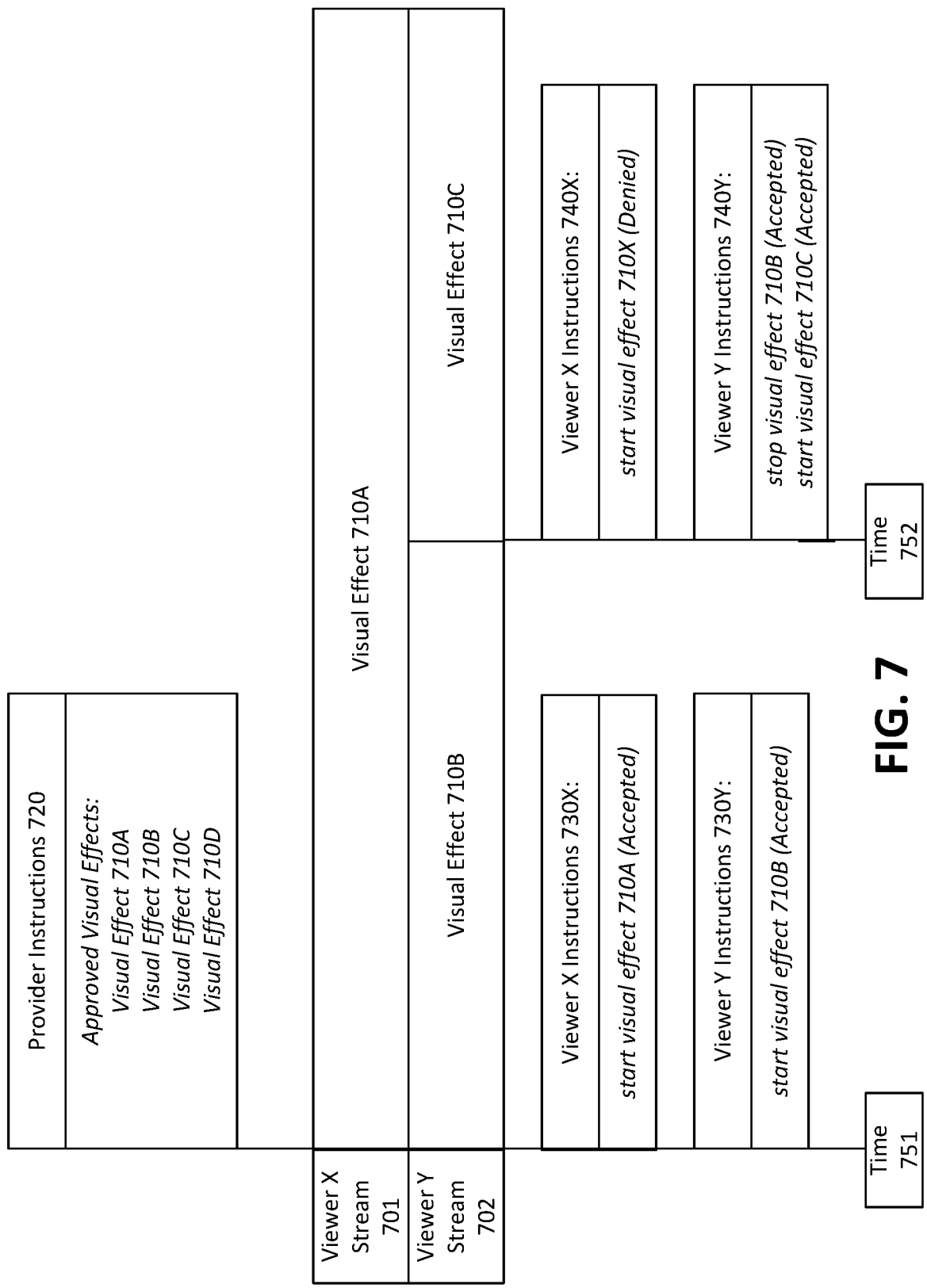
FIG. 7 is a diagram illustrating third example visual effects applications that may be used in accordance with the present disclosure.

Referring now to FIGS. 5-7, some examples of applying visual effects in accordance with the above techniques will now be described in detail. In particular, as shown in FIG. 5, a stream 501 including video content may be captured by a provider, such as a video game player/streamer, and transmitted by the provider to viewers via an intermediate video streaming service as described above. The provider may issue various provider instructions 520A-C, which may each be examples of the provider instructions 460 described above with respect to FIG. 4. As set forth above, in some cases, provider instructions 520A-C may be embedded into the video stream that is sent from the provider to the video streaming service, such as in a header of the video stream. Also, in some cases, provider instructions 520A-C may not be included within the video stream and may be sent separately from the video stream, such as via an external data stream and/or via other communication paths.

As shown in FIG. 5, provider instructions 520A may be associated with a time 551 and may include instructions to start applying a particular visual effect 510A to stream 501. The provider instructions 520A may be received by the video streaming service and may cause the video streaming service to start applying visual effect 510A to stream 501 at time 551. This is indicated in FIG. 5 by showing visual effect 510A within stream 501 to the right of the vertical line representing time 551. In some examples, provider instructions 520A may be received by the video streaming service at time 551, and the video streaming service may instantaneously (or almost instantaneously) begin applying visual effect 510A to stream 501. In other examples, provider instructions 520A may be sent in advance of time 551 and may include instructions to begin applying visual effect 510A at time 551.

As also shown in FIG. 5, provider instructions 520B may be associated with a time 552 and may include instructions to stop applying visual effect 510A and to start applying another visual effect 510B to stream 501. The provider instructions 520B may be received by the video streaming service and may cause the video streaming service, at time 552, to stop applying visual effect 510A and to start applying visual effect 510B to stream 501. This is indicated in FIG. 5 by showing visual effect 510B within stream 501 to the right of the vertical line representing time 552. In some examples, provider instructions 520B may be received by the video streaming service at time 552, and the video streaming service may instantaneously (or almost instantaneously) stop applying visual effect 510A and begin applying visual effect 510B. In other examples, provider instructions 520A may be sent in advance of time 552 and may include instructions to stop applying visual effect 510A and begin applying visual effect 510B at time 552.

Additionally, provider instructions 520C may be associated with a time 553 and may include instructions to start applying another visual effect 510C to stream 501. The provider instructions 520B may be received by the video streaming service and may cause the video streaming service, at time 553, to start applying visual effect 510C to stream 501 (while also continuing to apply visual effect 510B). This is indicated in FIG. 5 by showing visual effects 510B and 510C within stream 501 to the right of the vertical line representing time 553. In some examples, provider instructions 520C may be received by the video streaming service at time 553, and the video streaming service may instantaneously (or almost instantaneously) begin applying visual effect 510C. In other examples, provider instructions 520C may be sent in advance of time 553 and may include instructions to begin applying visual effect 510C at time 553.

Referring now to FIG. 6, streams 601 and 602 including video content may be captured by a provider, such as a video game player/streamer, and transmitted by the provider to viewers via an intermediate video streaming service. In particular, stream 601 is transmitted to Viewer A, while stream 602 is transmitted to Viewer B. In this example, the provider may issue various provider instructions 620A-B, which may each be examples of the provider instructions 460 described above with respect to FIG. 4. As shown in FIG. 6, provider instructions 620A may be associated with a time 651 and may include instructions to start applying visual effect 610A to Viewer A's stream (i.e., stream 601). Additionally, provider instructions 620A may also include instructions to start applying a different visual effect 610B to Viewer B's stream (i.e., stream 602). The provider instructions 520A may be received by the video streaming service and may cause the video streaming service to start applying visual effect 610A to stream 601 at time 651 and also to start applying visual effect 610B to stream 602 at time 651. This is indicated in FIG. 6 by showing visual effect 610A within stream 601 to the right of the vertical line representing time 651 and by showing visual effect 610B within stream 602 to the right of the vertical line representing time 651. As should be appreciated, this allows the provider to target visual effect 610A to Viewer A, while also targeting a different visual effect 610B to Viewer B.

As also shown in FIG. 6, provider instructions 620B may be associated with a time 652 and may include instructions to stop applying visual effect 610A and to start applying visual effect 610C to Viewer A's stream (i.e., stream 601). The provider instructions 520B may be received by the video streaming service and may cause the video streaming service to, at time 652, stop applying visual effect 610A and start applying visual effect 610C to stream 601. This is indicated in FIG. 6 by showing visual effect 610C within stream 601 to the right of the vertical line representing time 652. It is noted that provider instructions 620B do not indicate a change to Viewer B's stream, and, therefore, visual effect 610B continues to be applied to stream 602. As should be appreciated, this allows the provider to target visual effect 610C to Viewer A, while also targeting a different visual effect 610B to Viewer B.

Referring now to FIG. 7, streams 701 and 702 including video content may be captured by a provider, such as a video game player/streamer, and transmitted by the provider to viewers via an intermediate video streaming service. In particular, stream 701 is transmitted to Viewer X, while stream 702 is transmitted to Viewer Y. In this example, the provider may issue provider instructions 720A, which may be an example of the provider instructions 460 described above with respect to FIG. 4. As shown in FIG. 7, provider instructions 720A may be associated with a time 751 and may indicate that visual effects 710A-D are approved visual effects that are approved by the provider for application to streams 701-702 and possibly other streams from the provider. Additionally, in this example, Viewer X may issue Viewer X instructions 730X and 740X, and Viewer Y may issue Viewer Y instructions 730Y and 740Y, which may be examples of the viewer instructions 470 described above with respect to FIG. 4.

As shown in FIG. 7, Viewer X instructions 730X may be associated with time 751 and may request that visual effect 710A is to start being applied to stream 701. This request is accepted because visual effect 710A is included within the visual effects 710A-D that are approved by the provider within provider instructions 720. Thus, visual effect 710A is applied to stream 701 at time 751. Additionally, Viewer Y instructions 730Y may be associated with time 751 and may request that visual effect 710B is to start being applied to stream 702. This request is also accepted because visual effect 710B is included within the visual effects 710A-D that are approved by the provider within provider instructions 720. Thus, visual effect 710B is applied to stream 702 at time 751.

Furthermore, Viewer X instructions 740X may be associated with time 752 and may request that visual effect 710X is to start being applied to stream 701. This request is denied because visual effect 710X is not included within the visual effects 710A-D that are approved by the provider within provider instructions 720. Thus, visual effect 710X is not applied to stream 701. In some examples, an error message may be provided to Viewer X and may indicate why the request was denied and/or may provide a list of the approved visual effects 710A-D that are approved by the provider. Additionally, Viewer Y instructions 740Y may be associated with time 751 and may request that visual effect 710B is to stop being applied and visual effect 710C is to start being applied to stream 702. This request is accepted because visual effect 710C is included within the visual effects 710A-D that are approved by the provider within provider instructions 720. Thus, at time 752, visual effect 710C is applied to stream 702, while application of visual effect 710B is stopped.

Figure 8:
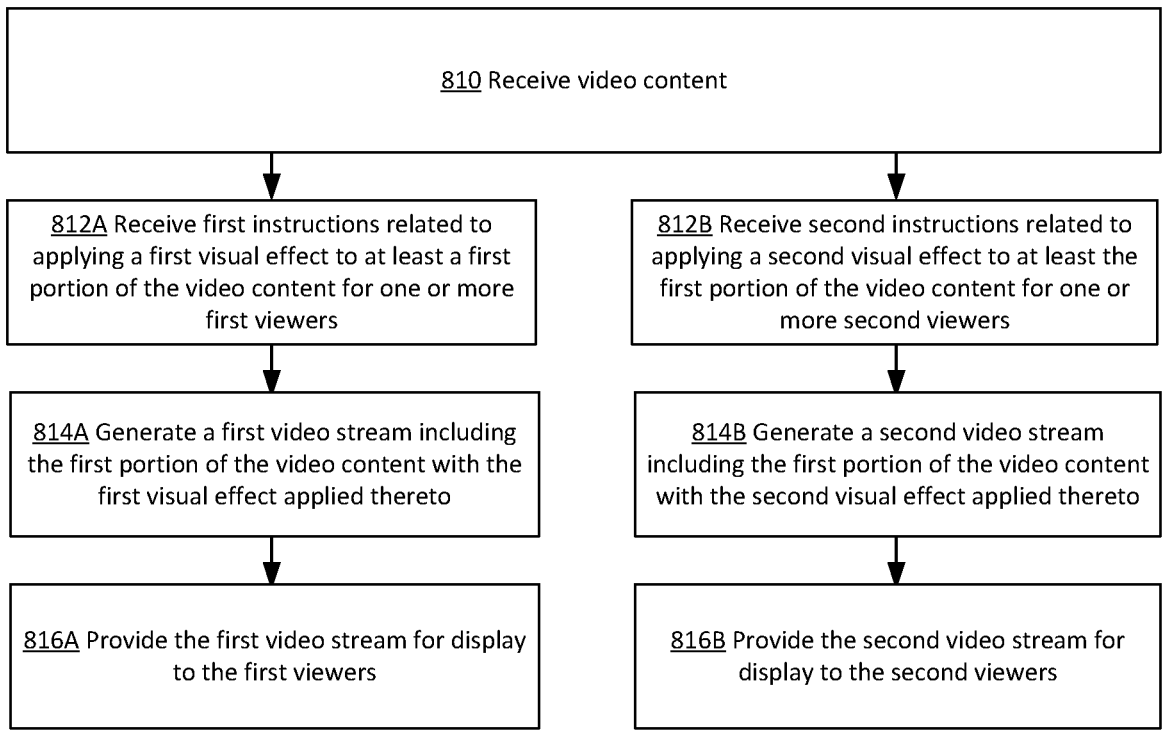
FIG. 8 is a flowchart illustrating an example visual effects application process that may be used in accordance with the present disclosure.

Referring now to FIG. 8, an example visual effects application process including visual effects targeting will now be described in detail. In some examples, the process of FIG. 8 may be performed by one or more of a content provider compute node, a video streaming service, a viewer compute node, and/or by other nodes or devices. As shown, the process of FIG. 8 is initiated at operation 810, at which video content is received. In some examples, operation 810 may be include receipt, by a video streaming service (e.g., video streaming service 110), of video content that is transmitted to the video service by a content provider (e.g., provider 100). As set forth above, in some examples, the video content may include video corresponding to (e.g., captured from) an event, such as a video game, a news event, sports event, or other event. In some examples, the video content may be captured from the event using screen capture software operated by the content provider, such as software that captures rendered graphical output of a video game. Also, in some examples, a plurality of video streams including the video content may be provided to a plurality of viewer nodes for display to a plurality of viewers. Each viewer node may include, for example, one or more computing devices and/or components operated by, or otherwise associated with, one or more respective viewers, such as computing devices and/or components that receive and play the video content. In some cases, the video content may be presented using live streaming whereby at least part of the video content is displayed, by the plurality of viewer nodes, to the plurality of viewers, while the event is still occurring.

At operation 812A, instructions are received related to applying a first visual effect to at least a first portion of the video content for one or more first viewers. The first portion of the video content may include, for example, one or more frames of the video content and/or portions of one or more frames of the video content. As set forth above, the first visual effect may include, for example, bleach bypass, sepia tone conversion, cross processing, a custom visual effect, and/or any combination of these or other visual effects.

In some examples, operation 812A may include receipt of the first instructions by a video streaming service, such as by effects manager 400 of FIG. 4 and/or other components of the video streaming service. The first instructions received at operation 812A may include provider instructions 460 of FIG. 4, viewer instructions 470 of FIG. 4, and/or any combination of these or other instructions. In some examples, the first instructions may identify the first viewers individually, such as by specific viewer names, identifiers, and the like. In other examples, the instructions may not identify the first viewers individually, but may instead indicate the first viewers based on various characteristics, such as viewers in particular locations, viewers having particular ages, viewers operating devices with particular characteristics (e.g., screen size, resolution, memory, processing speed, etc.), and many others. In yet other examples, the instructions may be issued by a particular viewer and may be executed on a local client device operated by the viewer.

In some examples, the first instructions may include instructions from the provider to apply a particular visual effect to the first portion of the video content. Also, in some examples, the first instructions may include indications of a plurality of approved visual effects that the provider approves of for application to the video content. In some examples, the plurality of approved visual effects may include the first visual effect, and the one or more first viewers may select the first visual effect from the plurality of approved visual effects. Additionally, in some examples, the first visual effect may be proposed by the one or more first viewers and accepted by the provider. Furthermore, in some examples, access to the first visual effect may be provided based, at least in part, on a quantity of viewers of the video content. For example, a video streaming service may allow the first visual effect to be applied to video content that has above a particular threshold quantity of viewers (e.g., average viewers, current total viewers, etc.). The first visual effect may be made available for use on the video content based on the quantity of viewers of the video content exceeding the threshold quantity. In yet other examples, the video content may be from a video game, and the first visual effect may be applied based at least in part on state data from the video game. For example, a provider may issue instructions to apply the first visual effect when the provider is winning a match and/or has moved his character to a particular virtual location in a game world. The video streaming service may examine the state data from the video game to determine that the state data indicates or matches the criteria for applying the first visual effect (e.g., the provider is winning a match and/or has moved his character to a particular virtual location in a game world) and may then apply the first visual effect based on this determination.

At operation 814A, a first video stream is generated that includes the first portion of the video content with the first visual effect applied thereto. Operation 814A may include applying the first visual effect to the video content. In some examples, the first visual effect may include conversion of one or more first pixel color values of the first portion of the video content to one or more second pixel color values. Also, in some examples, the conversion may include use of a lookup table, a per-pixel color conversion algorithm, and/or other information that allows determination of the one or more second pixel color values based on the one or more first pixel color values. As set forth above, the first video stream may be included in a plurality of video streams that include the video content and that are provided for display to a plurality of viewers. In some examples, the first visual effect may not be applied to the first portion of the video content in at least one other video stream of the plurality of video streams—and in some cases may not be applied to the first portion of the video content in any other video stream of the plurality of video streams. At operation 816A, the first video stream is provided for display to the one or more first viewers, such as by transmitting the first video stream over one or more communications networks to a first viewer node of the plurality of viewer nodes and/or by providing the first video stream to a media player or other display component that may be included at the first viewer node. The first viewer node may be operated by or otherwise associated with the one or more first viewers.

In the example of FIG. 8, operations 812B, 814B, and 816C are performed in association with generation of a second video stream that includes the first portion of the video content with a second visual effect applied thereto and that is provided for display to one or more second viewers. This provides an example of targeting the first visual effect to the one or more first viewers, while targeting the second visual effect to one or more second viewers. In particular, at operation 812B, second instructions are received related to applying a second visual effect to at least the first portion of the video content for one or more second viewers. At operation 814B, a second video stream is generated that includes the first portion of the video content with the second visual effect applied thereto. At operation 816B, the second video stream is provided for display to the one or more second viewers, such as by providing the second video stream to a second viewer node of the plurality of viewer nodes that is operated by or otherwise associated with the one or more second viewers. As set forth above, the second video stream may be included in a plurality of video streams that include the video content and that are provided for display to a plurality of viewers. In some examples, the second visual effect may not be applied to the first portion of the video content in at least one other video stream of the plurality of video streams—and in some cases may not be applied to the first portion of the video content in any other video stream of the plurality of video streams. In particular, in some examples, the second visual effect may not be applied to the first portion of the video content in the first video stream of operation 814A and 816A. Additionally, the first visual effect of operations 812A and 814A may not be applied to the first portion of the video content in the second video stream.

Figure 9:
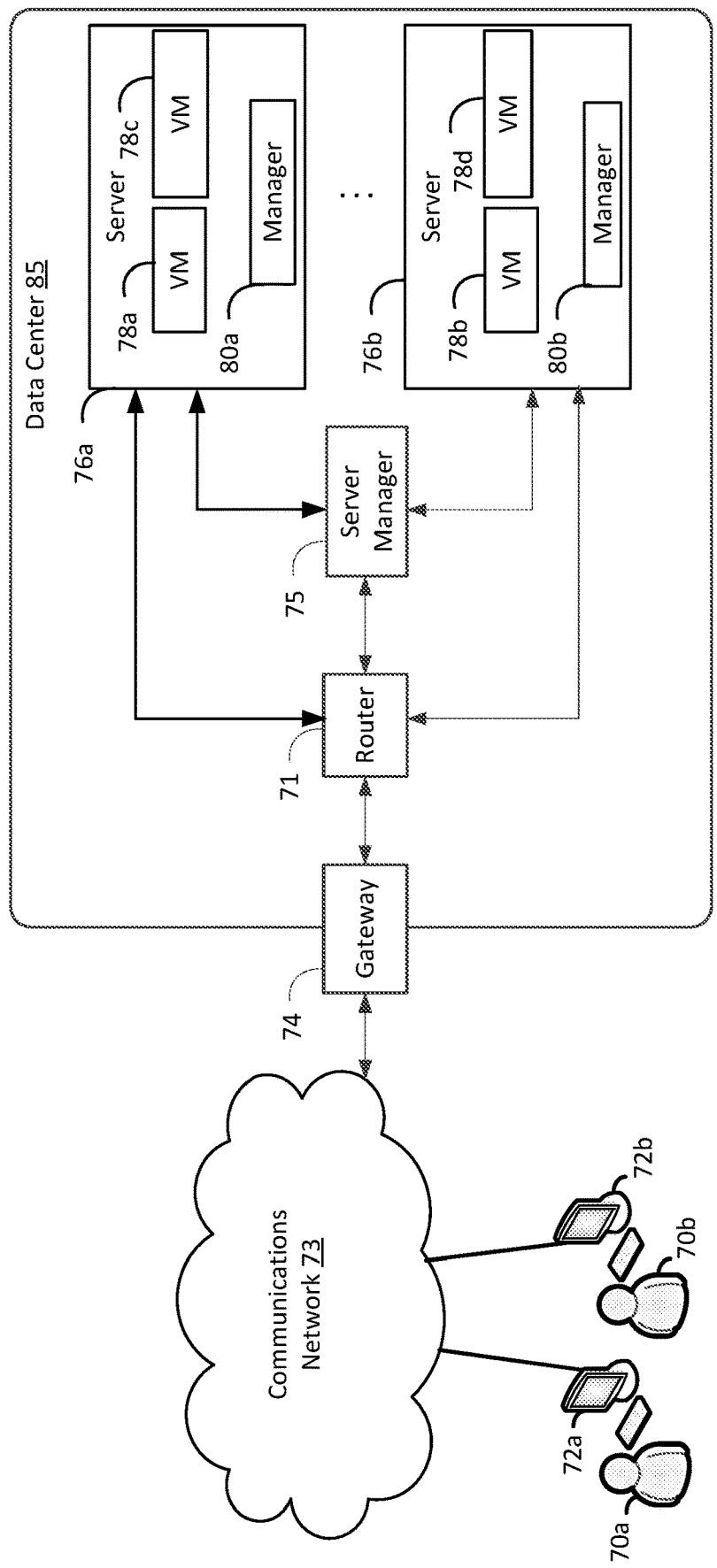
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
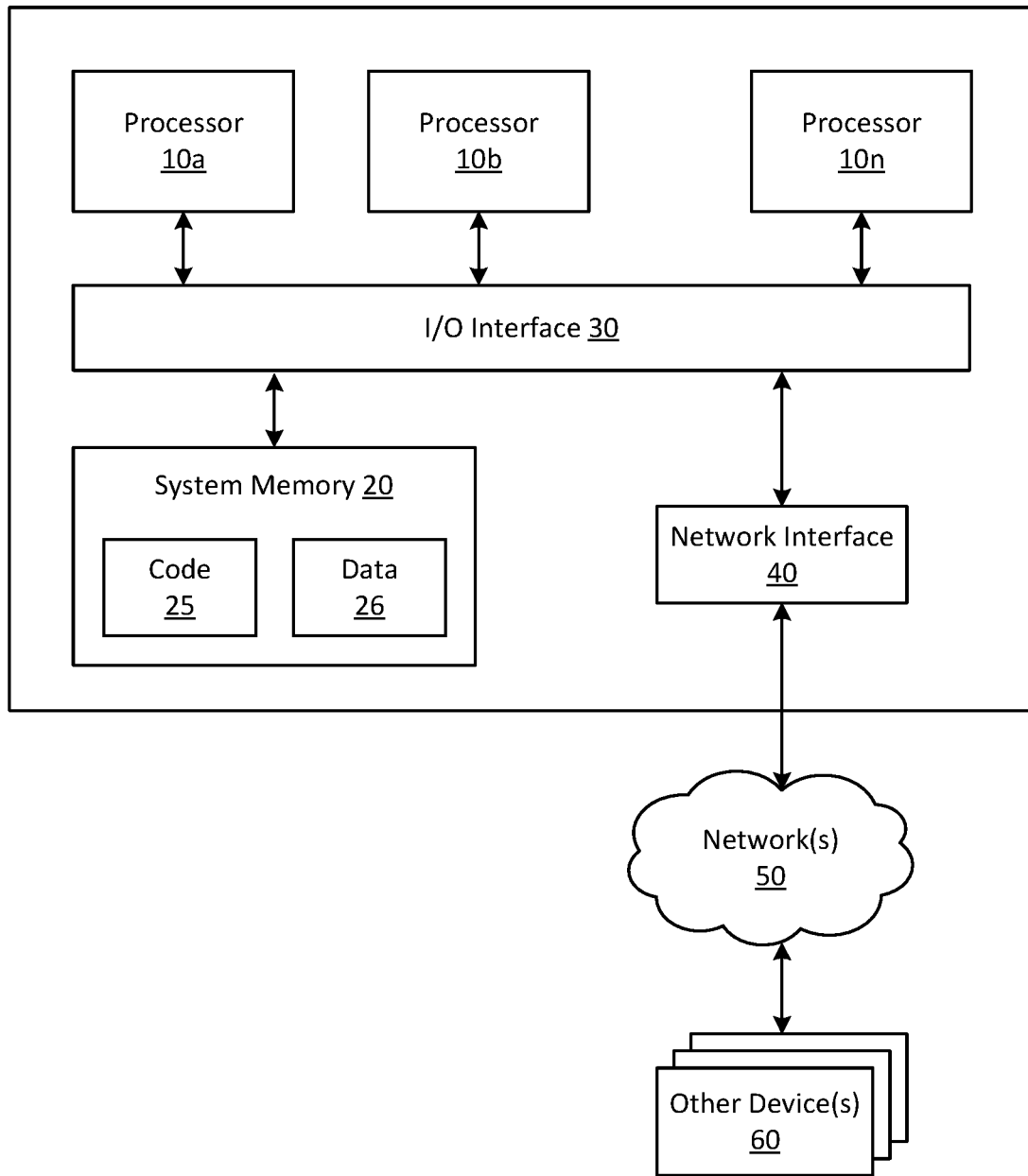
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for visual effect application comprising:
   one or more processors; and
   one or more memories having stored therein instructions that, upon execution by the one or more processors, cause the computing system perform operations comprising:
      receiving, from a provider, video content corresponding to an event, wherein the provider captures the video content from an application and provides the video content to a service for streaming to a plurality of viewers, wherein a plurality of video streams including the video content are provided for display to the plurality of viewers, the video content presented using live streaming whereby at least part of the video content is displayed to the plurality of viewers while the event is still occurring;

receiving, from the provider, instructions related to applying a first visual effect to at least a first portion of the video content for a first subset of the plurality of viewers but not for a second subset of the plurality of viewers, the first visual effect including conversion of one or more first pixel color values of the first portion of the video content to one or more second pixel color values;

generating a first video stream of the plurality of video streams, the first video stream including the first portion of the video content with the first visual effect applied thereto, wherein the first visual effect is not applied to the first portion of the video content in at least one other video stream of the plurality of video streams sent to at least one viewer in the second subset; and providing the first video stream for display to at least one viewer in the first subset.

2. The computing system of claim 1, further comprising:

generating a second video stream of the plurality of video streams, the second video stream including the first portion of the video content with a second visual effect applied thereto; and providing the second video stream for display to the at least one viewer in the second subset.

3. The computing system of claim 2, wherein the second visual effect is not applied to the first portion of the video content in the first video stream.

4. A computer-implemented method for visual effect application comprising:

receiving, from a provider, video content, wherein the provider captures the video content from an application and provides the video content to a service for streaming to a plurality of viewers, and wherein a plurality of video streams including the video content are provided to the plurality of viewers;

receiving, from the provider, instructions related to applying a first visual effect to at least a first portion of the video content for a first subset of the plurality of viewers but not for a second subset of the plurality of viewers, the first visual effect including conversion of one or more first pixel color values of the first portion of the video content to one or more second pixel color values;

generating a first video stream of the plurality of video streams, the first video stream including the first portion of the video content with the first visual effect applied thereto, wherein the first visual effect is not applied to the first portion of the video content in at least one other video stream of the plurality of video streams sent to at least one viewer in the second subset; and providing the first video stream to at least one viewer in the first subset.

5. The computer-implemented method of claim 4, further comprising:

generating a second video stream of the plurality of video streams, the second video stream including the first portion of the video content with a second visual effect applied thereto; and providing the second video stream to the at least one viewer in the second subset.

6. The computer-implemented method of claim 5, wherein the second visual effect is not applied to the first portion of the video content in the first video stream.

7. The computer-implemented method of claim 4, wherein access to the first visual effect is provided based, at least in part, on a quantity of viewers of the video content.

8. The computer-implemented method of claim 4, wherein the conversion comprises use of a lookup table that allows determination of the one or more second pixel color values based on the one or more first pixel color values.

9. The computer-implemented method of claim 4, wherein the first visual effect comprises at least one of bleach bypass, sepia tone conversion, cross processing, or a custom visual effect.

10. The computer-implemented method of claim 4, wherein the video content is from a video game, and wherein the first visual effect is applied based at least in part on state data from the video game.

11. The computer-implemented method of claim 4, wherein the video content corresponds to an event, and wherein the video content is presented using live streaming whereby at least part of the video content is displayed to the plurality of viewers while the event is still occurring.

12. One or more non-transitory computer-readable storage media having stored thereon instructions that, upon execution by a computing device, cause the computing device to perform operations comprising:

receiving, from a provider, video content, wherein the provider captures the video content from an application and provides the video content to a service for streaming to a plurality of viewers, and wherein a plurality of video streams including the video content are provided to the plurality of viewers;

receiving, from the provider, instructions related to applying a first visual effect to at least a first portion of the video content for a first subset of the plurality of viewers but not for a second subset of the plurality of viewers, the first visual effect including conversion of one or more first pixel color values of the first portion of the video content to one or more second pixel color values;

generating a first video stream of the plurality of video streams, the first video stream including the first portion of the video content with the first visual effect applied thereto, wherein the first visual effect is not applied to the first portion of the video content in at least one other video stream of the plurality of video streams sent to at least one viewer in the second subset; and providing the first video stream to at least one viewer in the first subset.

13. The one or more non-transitory computer-readable storage media of claim 12, wherein access to the first visual effect is provided based, at least in part, on a quantity of viewers of the video content.

14. The one or more non-transitory computer-readable storage media of claim 12, wherein the conversion comprises use of a lookup table that allows determination of the one or more second pixel color values based on the one or more first pixel color values.

15. The one or more non-transitory computer-readable storage media of claim 12, wherein the first visual effect comprises at least one of bleach bypass, sepia tone conversion, cross processing, or a custom visual effect.

16. The one or more non-transitory computer-readable storage media of claim 12, wherein the video content is from a video game, and wherein the first visual effect is applied based at least in part on state data from the video game.

17. The one or more non-transitory computer-readable storage media of claim 12, wherein the video content corresponds to an event, and wherein the video content is presented using live streaming whereby at least part of the video content is displayed to the plurality of viewers while the event is still occurring.

* * * * *